US008891262B2

(12) United States Patent
Metzler

(10) Patent No.: US 8,891,262 B2
(45) Date of Patent: Nov. 18, 2014

(54) SERIES SWITCH BRIDGELESS POWER SUPPLY

(75) Inventor: Crispin Metzler, Hastings, MN (US)

(73) Assignee: Polar Semiconductor, LLC, Bloomington, MN (US)

( * ) Notice: Subject to any disclaimer, the term of this patent is extended or adjusted under 35 U.S.C. 154(b) by 0 days.

(21) Appl. No.: 14/007,260

(22) PCT Filed: Mar. 24, 2011

(86) PCT No.: PCT/US2011/029725
§ 371 (c)(1),
(2), (4) Date: Sep. 24, 2013

(87) PCT Pub. No.: WO2012/128768
PCT Pub. Date: Sep. 27, 2012

(65) Prior Publication Data
US 2014/0022828 A1    Jan. 23, 2014

(51) Int. Cl.
| H02M 1/12 | (2006.01) |
| H02M 1/42 | (2007.01) |
| H02M 1/44 | (2007.01) |
| H02M 3/335 | (2006.01) |
| H02J 1/00 | (2006.01) |
| H02J 1/02 | (2006.01) |
| H02M 3/24 | (2006.01) |

(52) U.S. Cl.
CPC .............. *H02M 1/12* (2013.01); *H02M 1/4258* (2013.01); *H02M 1/44* (2013.01); *Y02B 70/126* (2013.01)
USPC .................... 363/44; 363/15; 363/16; 363/39; 363/95

(58) Field of Classification Search
USPC ............ 363/15, 34, 37, 39, 44–48, 81, 84, 95
See application file for complete search history.

(56) References Cited

U.S. PATENT DOCUMENTS

| 3,573,597 | A | * | 4/1971 | Genuit et al. | 363/28 |
| 3,963,975 | A | * | 6/1976 | Gauper et al. | 363/15 |
| 4,408,154 | A | * | 10/1983 | Cote | 323/340 |
| 4,700,113 | A | * | 10/1987 | Stupp et al. | 315/224 |
| 5,907,479 | A | * | 5/1999 | Leu | 363/16 |

(Continued)

OTHER PUBLICATIONS

The International Search Report and Written Opinion in counterpart International Application No. PCT/US2011/029725 filed Mar. 24, 2011.

*Primary Examiner* — Adolf Berhane
*Assistant Examiner* — Henry Lee, III
(74) *Attorney, Agent, or Firm* — Kinney & Lange, P.A.

(57) ABSTRACT

A series-switch bridgeless power supply provides common-mode EMI filtering. The power supply includes a center-tapped inductive device bifurcated into first and second windings. The AC input, provided at first and second input terminals, is applied to the center-tap of the inductive device. First and second switches are connected to distal ends of the first and second windings, respectively, and are connected in series with one another to form a circuit path from the first input terminal, through the inductive device and each of the series-connected switches, back through the inductive device and to the second input terminal. A controller turns the switches On and Off to modulate the current through the inductive device. Common-mode voltage generated by the modulation of the first and second switches is filtered by connection of each switch to a junction defined between a pair of capacitors connected in series between the first and second input terminal. The topology provides a first stage, two-pole filter for filtering common-mode voltages.

14 Claims, 3 Drawing Sheets

(56) References Cited

U.S. PATENT DOCUMENTS

| | | | |
|---|---|---|---|
| 6,282,103 B1* | 8/2001 | Naito et al. | 363/21.12 |
| 7,133,298 B2* | 11/2006 | Schimel | 363/15 |
| 8,687,388 B2* | 4/2014 | Jang et al. | 363/44 |
| 2002/0114176 A1* | 8/2002 | Morita et al. | 363/95 |
| 2005/0105311 A1 | 5/2005 | Soldano | |
| 2006/0208711 A1 | 9/2006 | Soldano et al. | |
| 2006/0220628 A1 | 10/2006 | Soldano | |
| 2007/0008747 A1 | 1/2007 | Soldano et al. | |
| 2012/0044729 A1* | 2/2012 | Coleman et al. | 363/126 |

* cited by examiner

SERIES SWITCH BRIDGELESS POWER SUPPLY

BACKGROUND

The present invention relates to power supplies and in particular to power factor correction (PFC) power supplies.

Electric power is distributed almost universally in an alternating current (AC) format that allows for efficient transmission. Most devices however, including personal computers, televisions, etc., require direct current (DC) power. Power supplies (or converters) act to convert the AC input supplied by a line to a DC output suitable for consumption by a device or load, or act to convert a DC input to a DC output (i.e., a DC-to-DC converter). A switched-mode power supply (SMPS) employing a boost regulator is commonly employed in this role of AC-to-DC or DC-to-DC power conversion. A benefit of employing a SMPS having a boost regulator topology is the boost regulator can be controlled to provide power factor correction, wherein the term "power factor correction" refers to the efficiency of the circuit (i.e., real power versus apparent power). Power factor correction typically involves ensuring that the current drawn by the PFC circuit is in-phase with the voltage provided by the PFC boost regulator. Subsequent stages may be employed to step-down the output of the PFC boost regulator to a desired DC output voltage, and other topologies may be employed in conjunction with or instead of boost regulator topologies, such as flyback topologies.

A distinction between PFC power supplies can be made between those power supplies that include a first stage rectifier bridge and so-called bridgeless PFC boost regulators. The first stage rectifier bridge includes four diodes, connected in a bridge topology to rectify the AC input supplied by the line. The voltage drops associated with each diode represent losses that lower the overall efficiency of the power supply. Improvements to PFC power supplies have included the use of half-bridge designs that employ two diodes instead of four, and bridgeless PFC power supplies that further reduce the number of semiconductor devices (e.g., diodes, switches) required in any given circuit path, thereby further improving efficiency. However, typical bridgeless PFC power supply topologies introduce common-mode electromagnetic interference (EMI) that is difficult to filter.

SUMMARY

A series-switch bridgeless power supply converts an AC input to a DC output. The power supply includes first and second terminals connected to receive the AC input. The power supply further includes first and second capacitors connected in series with one another between the first and second terminals, with a first junction defined between the first and second capacitor. The power supply includes a center-tapped inductive device having a primary winding bifurcated into a first winding and a second winding. The first winding has a first end and a second end, with the first end connected to the first terminal. The second winding has a first end and a second end, with the first end connected to the second terminal. A capacitor is connected between the first end of the first winding and the first end of the second winding. The power supply includes first and second switches, each switch having a control terminal and first and second controlled terminals. The first controlled terminal of the first switch is connected to the second end of the first winding, and the first controlled terminal of the second switch is connected to the second end of the second winding. The second controlled terminals of the first and second switches are electrically to one another, such that the first and second switches are connected in series with one another. A controller is connected to the control terminals of the first and second switches, and selectively turns the switches On and Off to charge/discharge the inductive device. Filtering of common-mode voltage is provided by connecting the second controlled terminals of the first and second switches to the junction between the first and second capacitors.

DETAILED DESCRIPTION

The power supply topology taught by the present invention reduces common mode electromagnetic interference (EMI) that is commonly found in bridgeless PFC power supplies. The topology relies on a center-tapped inductive device (e.g., a center-tapped transformer in a flyback configuration, center-tapped inductor in a boost regulator configuration). Switching devices having first controlled ends (e.g., sources of a MOSFET) are connected to opposite ends of the center-fed inductive device and second controlled ends (e.g., drains of each MOSFET) are connected to one another such that the switches are connected in series with one another during both cycles of the AC input. A pair of capacitors are connected across the AC inputs and the junction between the pair of capacitors is connected to a common (i.e., ground) node, which is also connected to the second controlled ends of each switch. This topology allows common-mode EMI to be shunted from the junction between the pair of capacitors to the second controlled ends of the respective switches.

Figure 1A:
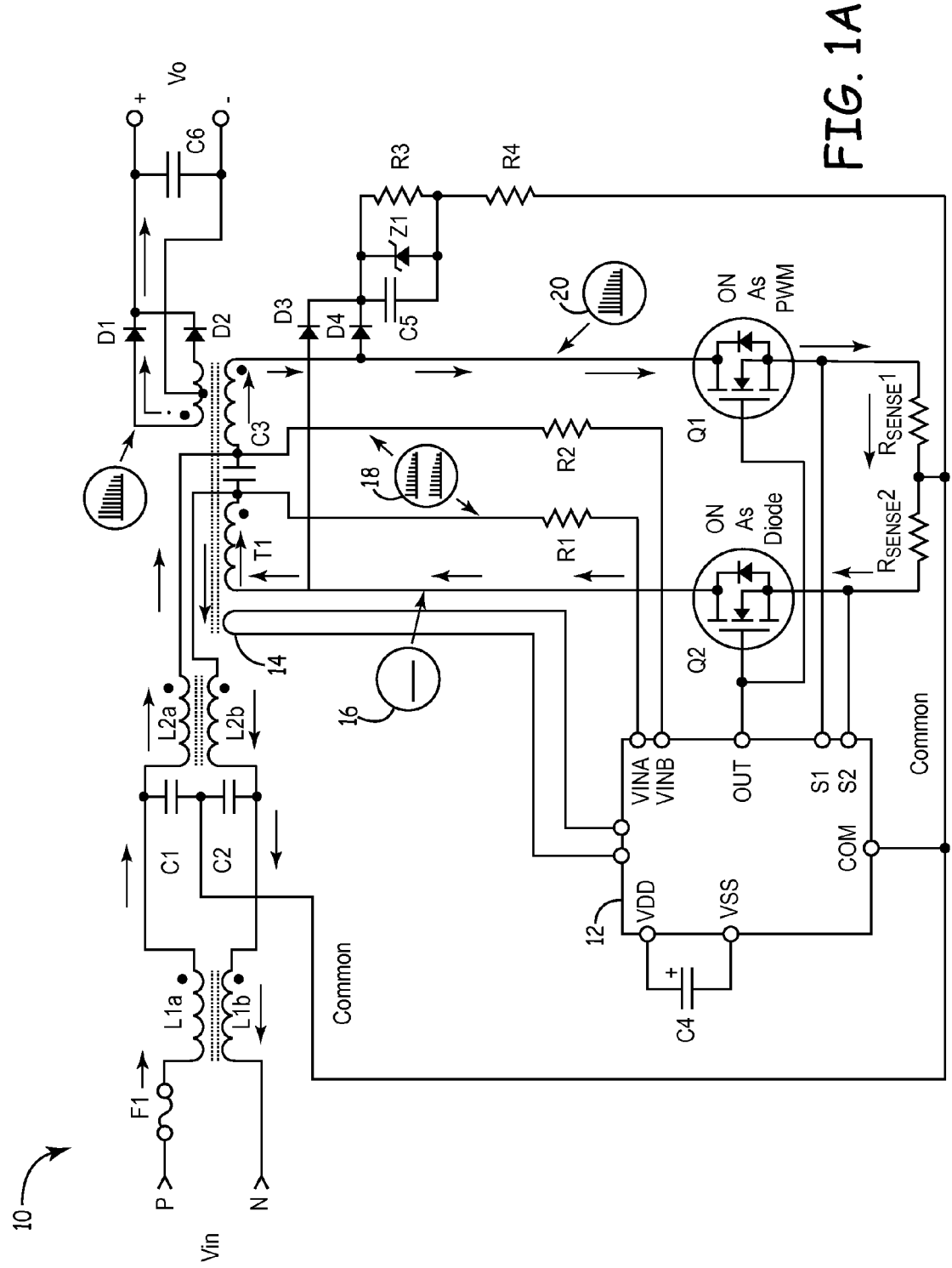
FIGS. 1A and 1B are circuit diagrams of a bridgeless PFC flyback converter power supply according to an embodiment of the present invention.
Figure 1B:
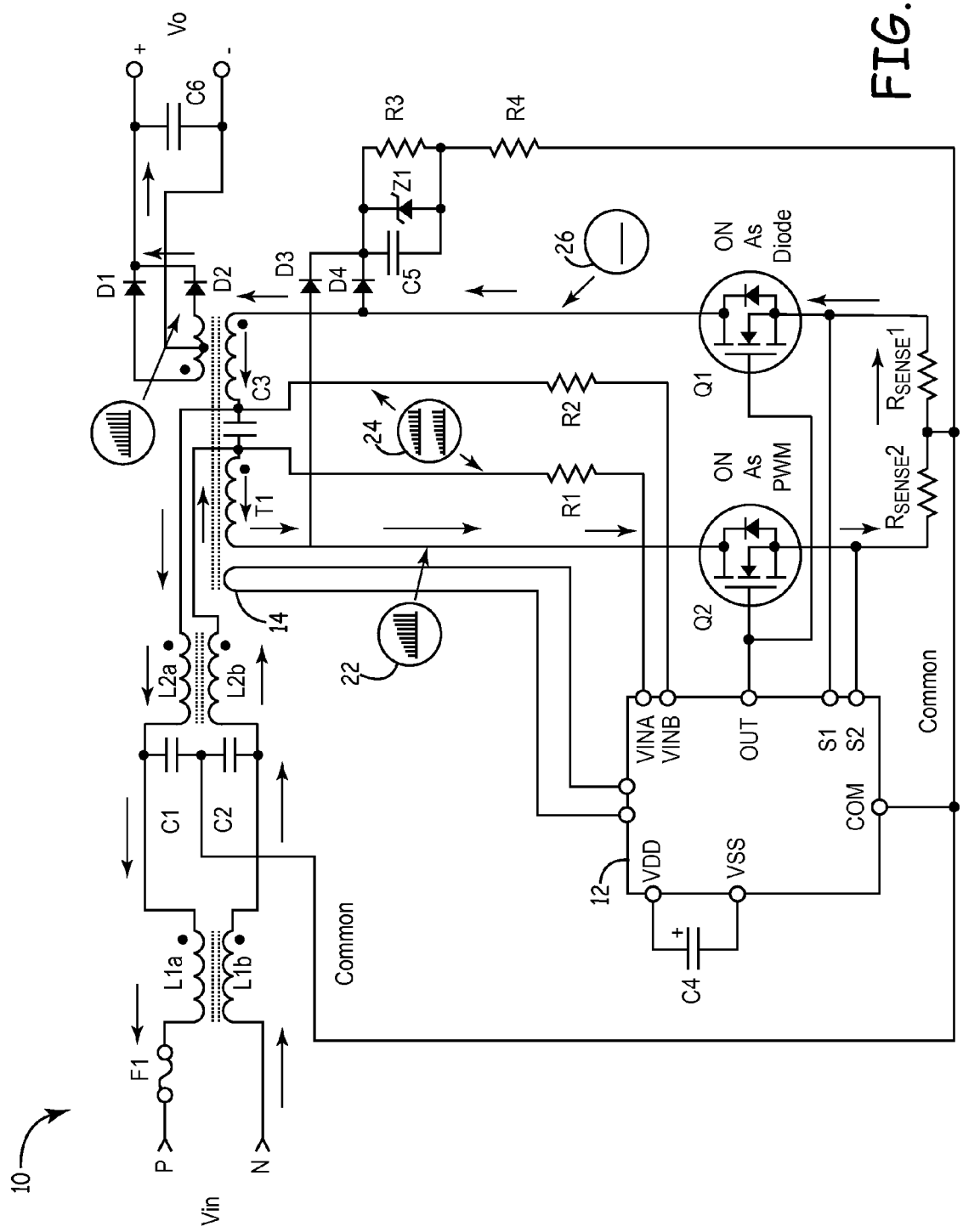

FIGS. 1A and 1B are circuit diagrams of bridgeless PFC flyback converter power supply 10 (hereinafter, "power supply 10") according to an embodiment of the present invention. Power supply 10 converts the AC input received at input terminals P and N to a DC output Vo. The AC input includes a positive half-cycle and a negative half-cycle. To simplify the discussion of the circuit topology the voltages are described relative to the common node, assumed to be approximately zero. As a result, during the positive half-cycle the voltage at input terminal P is described as positive, and during the negative half-cycle the voltage at input terminal N is described as positive.

The embodiment shown in FIGS. 1A and 1B is a series-switch bridgeless flyback supply 10 with central-fed transformer T1. Power supply 10 is described as bridgeless because it does not include a rectifier bridge commonly employed in supply circuits to rectify the AC input voltage. Rather, input terminal P is connected via inductors L1a, L2a to a first center-tap position within the primary winding of transformer T1. Input terminal N is connected via inductors L1b, L2b to a second center-tap position within the primary winding of transformer T1. In this way, the primary winding of transformer T1 is bifurcated into a first and second winding, and is center-fed by the connection of the AC inputs to the center-tap position. Capacitors C1, C2 are connected in series with one another between the AC input terminals and the junction between capacitors C1, C2 provides a connection to a common node, discussed in more detail below.

The ends of the primary winding of transformer T1 are connected to respective switches Q1 and Q2, which include first and second controlled terminals and a control terminal. In the embodiment shown in FIGS. 1A and 1B, switches Q1 and Q2 are metal-oxide semiconductor field-effect transistors (MOSFETs), each having a drain, a source and a gate that correspond to first and second controlled terminals and the control terminal, respectively. In other embodiments, other switching devices such as bipolar junction transistors (BJTs), insulated gate BJTs, etc., may be employed by power supply 10. In the embodiment shown in FIGS. 1A, 1B, the drains of switches Q1, Q2 are connected to the respective ends of the primary winding of transformer T1. Controller 12 provides drive signals to the gates of switches Q1, Q2 to control whether the switches are On (conducting) or Off (not conducting). The sources of switches Q1, Q2 are connected together (via sense resistors Rsense1, Rsense2), with the junction between the current sense resistors being connected to a common node.

During operation as a flyback converter, switches Q1 and Q2 are turned On and Off to transfer energy from the primary winding to the secondary winding of transformer T1. Because the sources of switches Q1 and Q2 are connected together, a circuit path is created in which switches Q1 and Q2 are connected in series. Depending on the polarity of the AC input, one switch operates as a high-frequency switch to modulate the AC input voltage while the other switch operates as a synchronous rectifier due to the presence of a body diode between the source and drains of each switch. This is illustrated in more detail with respect to the current paths and waveforms generated during the positive and negative half-cycles of the AC input voltage. Diodes D1 and D2 are connected to the secondary winding and rectify the output of the secondary winding to provide a DC output across capacitor C6.

A benefit of this circuit topology is the ability of the circuit to filter common-mode EMI that would otherwise be provided across capacitor C3. Typical methods of filtering this common-mode EMI include the presence of large inductive filters connected to each AC input. However, by connecting the sources of switches Q1, Q2 to the junction between capacitors C1, C2, a two-pole filter is created that is capable of shunting common-mode EMI (harmlessly) through capacitor C1 or C2 to the sources of switches Q1, Q2. The operation of power supply 10 in filtering common-mode EMI is described below with respect to both the positive and negative half-cycles of the AC input voltage.

FIG. 1A depicts the flow of current through power supply 10 during the positive half-cycle of the AC input voltage VAC and FIG. 1B depicts the flow of current through power supply 10 during the negative half-cycle of AC input VAC. The flow of current is depicted by the direction of the arrows. In addition, sample waveforms are illustrated in FIGS. 1A, 1B with respect to several portions of the circuit, illustrating the desired filtering of common-mode voltages.

In the positive half-cycle shown in FIG. 1A, the voltage at terminal P is positive relative to the voltage at terminal N. As a result, a current path is created that flows (as indicated by the arrows) from input terminal P, through inductors L1a, L2a to the center-tap on the primary winding of transformer T1, through switch Q1, current sense resistors Rsense1, Rsense2, and series-connected switch Q2, to the center-tap on the primary winding of transformer T1, and back to input terminal N via inductors L2b, L1b. During this time, controller 12 turns switch Q1 On and Off to generate the desired DC output and provide the desired power factor correction to the AC input. When switch Q1 is On, current flows through the described circuit path, and when switch Q1 is Off the circuit path is broken and no current flows in the circuit (although when switch Q1 is Off, flyback current is generated in the secondary winding of transformer T1).

The modulation of switch Q1 is illustrated by voltage waveform 20 shown adjacent to switch Q1, with the positive half-cycle being modulated as indicated into a plurality of pulses. The modulation of switch Q1 results in significant common-mode voltages being provided onto the center-tap of transformer T1 as common-mode EMI, illustrated by voltage waveform 18 shown adjacent to the nodes on either side of capacitor C3. The series-connection of switch Q2 (acting as a synchronous rectifier) prevents common-mode EMI from being propagated across switch Q2, as illustrated by voltage waveform 16 shown adjacent to switch Q2. To filter the common-mode voltage (EMI) provided at the center-tap of transformer T1, a two-pole filter is created by connecting the sources of switches Q1, Q2 to the junction between capacitors C1, C2. The low-resistance path created by switch Q2 between the common node and the AC input terminal N, and the connection of the common node to the junction between capacitors C1, C2, results in the voltage between the input terminal and the junction between the capacitors being very small. As a result, common-mode EMI is shunted from the junction of capacitors C1,C2 to the source of switch Q1

In the negative half-cycle shown in FIG. 1B, the input voltage at terminal N is positive relative to the voltage at terminal P, and current flows (as indicated by the arrows) from the terminal N, through inductors L1b, L2b to the center-tap on the primary winding of transformer T1, through switch Q2, resistors Rsense2, RSense1, series-connected switch Q1, and back to the center-tap, and through inductors L2a, L1a to terminal P. During the negative half-cycle, controller 12 turns switch Q2 On and Off to generate the desired DC output and provide the desired power factor correction to the AC input. When switch Q2 is On, current flows through the described circuit path (opposite in direction to the circuit path described with respect to FIG. 1A). When switch Q2 is Off, the circuit path is broken and no current flows, except for that current flowing in the secondary winding of transformer T1.

The modulation of switch Q2 is illustrated by voltage waveform 22 shown adjacent to switch Q2, with the negative half-cycle being modulated as indicated into a plurality of pulses. The modulation of switch Q2 results in significant common-mode voltages being provided onto the center-tap of transformer T1 as common-mode EMI, as illustrated by voltage waveform 24 shown adjacent to the nodes on either side of capacitor C3. The series-connection of switch Q1 results in switch Q1 operating as a synchronous rectifier (i.e., diode) that prevents common-mode EMI from being propagated across switch Q1, as evidence by voltage waveform 26 shown adjacent to switch Q1. Despite the reversal of the current path, the connection of the junction between capacitors C1, C2 to the source of switches Q1, Q2 provides a two-pole filter, in which a shunt connection between junction of the capacitors and the source of switch Q2 provides filtering of the common-mode EMI.

Controller 12 regulates the DC output voltage V0 based, at least in part, on the monitored input voltage and the monitored current. A benefit of the series connection of switches Q1 and Q2 is that sense resistors Rsense1 and Rsense2 can be used to monitor the current (often referred to with respect to power supplies as IS sense). In the embodiment shown in FIGS. 1A and 1B, controller 12 employs differential current sensing to monitor the current. For example, during the positive half-cycle, the voltage monitored at input S1 is positive with respect to the common node and the voltage at input S2.

During the negative half-cycle, the voltage monitored at input S2 is positive with respect to the common node and the voltage at input S1. The difference between the voltage monitored at input S1 and S2 (i.e., absolute value of the difference) represents the current.

Similarly, differential sensing is employed to monitor the input voltage, with controller 12 monitoring the difference in voltage across capacitor C3. Applying the AC input voltage to the center-tap of transformer T1 results in one-half of the voltage being applied to either side of capacitor C3 as illustrated by waveforms 18 and 24 shown with respect to the center-tap position across capacitor C3 in FIGS. 1A and 1B, respectively. The sum of the voltages provided to inputs VinA and VinB of controller 12 represents the magnitude of the AC input voltage Vin. In other embodiments, sensing of the AC input voltage is provided by monitoring the voltage through either switch Q1 or Q2. However, this requires decision-making regarding which voltage to monitor because one of the voltages is near zero during each half-cycle of the input voltage. The benefit of summing the voltages on both sides of capacitor C3 is that the sum will equal the magnitude of the AC input voltage, without requiring decision-making. In addition, in the embodiment shown in FIGS. 1A, 1B, in which tertiary winding 14 powers controller 12, resistors R1, R2 provide the impedance required for monitoring of the voltage, while also serving to supply start-up power to controller 12 (used to charge capacitor C4) until tertiary winding 14 is able to supply the power required by controller 12.

Diodes D3, D4, capacitor C5, Zener diode Z1, and resistors R3, R4 form a center-tapped snubber circuit used to protect against transient overvoltage conditions associated with transformer T1. In other embodiments, the center-tapped snubber circuit may be replaced with a bridged snubber circuit that includes two additional diodes connected to form a bridge with diodes D3 and D4.

In this way, power supply 10 offers the efficiency of a bridgeless power supply, while providing a solution to the EMI filtering problems associated with typical bridgeless power supplies. In addition, a benefit of the common node provided by the present invention is it provides a general purpose connection point equivalent to the AC input neutral line N. The common node can be connected to transformer shields, heat sinks, etc. to help simplify EMI management and PC board layout planning.

Figure 2:
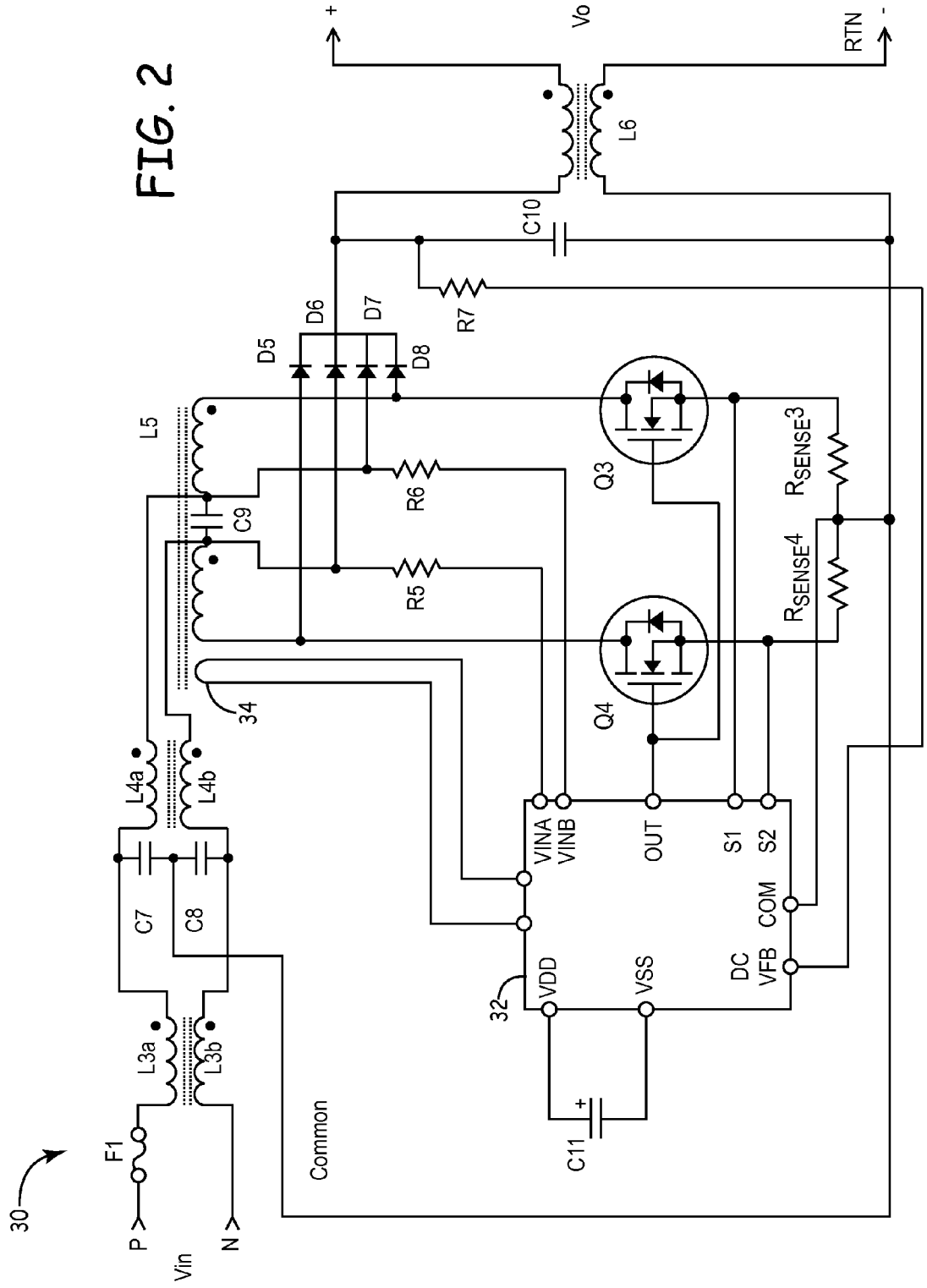
FIG. 2 is a circuit diagram of a bridgeless PFC boost regulator power supply according to an embodiment of the present invention.

FIG. 2 is a circuit diagram of bridgeless PFC boost regulator power supply 20 according to an embodiment of the present invention. Similar to power supply 10 described with respect to FIGS. 1A and 1B, power supply 20 converts an AC input voltage to a DC output voltage. Instead of employing a flyback configuration, however, power supply 20 employs a boost regulator topology in which the center-tapped transformer is replaced by center-tapped inductor L5. Diodes D5, D6, D7 and D8 rectify the output of center-tapped inductor L5 to provide a DC output voltage.

In the embodiment shown in FIG. 2, AC input voltage Vin is once again provided at input terminals P and N. Input terminal P is connected via inductors L3a, L4a to a first center-tap position of center-tapped inductor L5. Input terminal N is connected via inductors L3b, L4b to a second center-tap position of inductor L5. Similar to the bifurcation of the primary winding of center-tapped transformer T1 discussed with respect to FIGS. 1A, 1B, inductor L5 is bifurcated into first and second winding portions, with capacitor C9 connected between the first and second winding portions. Capacitors C7, C8 are connected in series with one another between the AC input terminals and the junction between capacitors C7, C8 provides a connection to the common node.

The ends of inductor L5 are connected to respective switches Q3, Q4. In the embodiment shown in FIG. 2, switches Q3, Q4 are once again MOSFETs having a drain, a source, and a gate corresponding with first and second controlled terminals and a control terminal. As discussed above, in other embodiments the MOSFETs may be replaced with other types of well-known switching devices. In the embodiment shown in FIG. 2, the drains of switches Q3, Q4 are connected to the respective distal ends of center-tapped inductor L5. Controller 22 provides drive signals to the gates of switches Q3, Q4 to control whether the switches are On or Off, and the sources of switches Q3, Q4 are connected together via sense resistors Rsense3, Rsense4. In this way, switches Q3, Q4 are connected in series with one another.

During operation as a boost converter, switches Q3, Q4 are turned On and Off to alternatively charge/discharge inductor L5. When switches Q3, Q4 are On a circuit path including series-connected switches Q3, Q4 is created that causes energy to be stored in inductor L5. When switches Q3, Q4 are Off, the circuit path including series-connected switches Q3, Q4 is broken, and inductor L5 discharges stored energy through diodes D5 or D8 (providing the desired rectification of the signal) to DC output Vo. Diodes D6 and D7 prevent unwanted core saturation during start up and other transient conditions wherein the AC input voltage Vin exceeds the DC output Vout.

During the positive half-cycle of AC input voltage Vin, the voltage at terminal P is positive relative to the voltage at terminal N. Current flows from terminal P, through inductors L3a, L4a to the center-tap position of inductor L5, through switch Q3, sense resistors Rsense3, Resense4, series-connected switch Q4, to the center-tap of inductor L5, and through inductors L4b, L3b to terminal N. During the positive half-cycle, the state of switch Q3 determines the whether current flows in the circuit path as described. The modulation of switch Q3 provides the desired boost conversion of the AC input voltage, but also provides significant common-mode voltage onto the center-tap of inductor L5. Switch Q4 acts as a synchronous rectifier due to the presence of the body diode between the source and drain of the device, and prevents common-mode voltage from being propagated across switch Q4. However, this still leaves significant common-mode voltage at the center-tap position of inductor L5.

The common-mode voltage provided at the center-tap of inductor L5 is filtered by connecting the source of switches Q3, Q4 to the junction between capacitors C7, C8. The low-resistance path created by switch Q4 between the common node and the AC input terminal N, and the connection of the common node to the junction between capacitors C7, C8 results in the voltage between input terminal N and the junction between capacitors C7, C8 being very small. As a result, common-mode EMI is shunted from the junction of capacitors C7, C8 to the source of switch Q3, with capacitors C7, C8 and inductors L4a, L4b providing a first stage two-pole filter.

During the negative half-cycle of AC input voltage Vin, the voltage at terminal N is positive relative to the voltage at terminal P. The direction of the current is reversed, and switch Q4 now determines whether the circuit path is closed or open. Modulation provided by switch Q4 results in common-mode voltage once again being provided into the center-tap position of inductor L5. Switch Q3 acts as a synchronous rectifier due to the body diode between the source and drain of switch Q4, and prevents common-mode voltage from being propagated onto switch Q3. However, this still leaves significant common-mode voltage at the center-tap position of inductor L5.

The common-mode voltage provided at the common-mode of inductor L5 is filtered by connecting the sources of switches Q3, Q4 to the junction between capacitors C7, C8. The low-resistance path created by switch Q3 between the common node and the AC input terminal P, and the connection of the common node to the junction between capacitors C7, C8 results in the voltage between input terminal N and the junction between capacitors C7, C8 being very small. As a result, common-mode EMI is shunted from the junction of capacitors C7, C8 to the source of switch Q4, with capacitors C7, C8 and inductors L4a, L4b providing a first stage two-pole filter.

Controller 22 provides regulation of the DC output Vo and power factor correction based, at least in part, on the monitored input voltage and the monitored current. As described with respect to the embodiment shown in FIGS. 1A, 1b, sense resistors Rsense3 and Rsense4 are employed to provide differential monitoring of the input current (often referred to with respect to power supplies as IS sense). Similarly, differential sensing is employed to monitor the input voltage, with controller 22 monitoring the difference in voltage across capacitor C9 via resistors R5, R6. In addition, in the embodiment shown in FIGS. 1A, 1B, in which tertiary winding 24 powers controller 22, resistors R5, R6 provide the impedance required for monitoring of the voltage, while also serving to supply start-up power to controller 22 (used to charge capacitor C11) until tertiary winding 24 is able to supply the power required by controller 12.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A series-switch bridgeless power supply comprising:
   first and second terminals for receiving an alternating current (AC) input; a first and second capacitor connected in series with one another between the first and second terminals, a first junction being defined between the first and second capacitor;
   a center-tapped inductive device bifurcated into a first winding and a second winding, the first winding having a first end and a second end, the first end connected to the first terminal at a first center-tap position of the inductive device, the second winding having a first end and a second end, the first end connected to the second terminal at a second center-tap position of the inductive device;
   a third capacitor connected between the first and second center-tap positions of the inductive device;
   a first switch having a control terminal and first and second controlled terminals, the first controlled terminal electrically connected to the second end of the first winding;
   a second switch having a control terminal and first and second controlled terminals, the first controlled terminal connected to the second end of the second winding and the second controlled terminal electrically connected to the second controlled terminal of the first switch; and
   a controller having first and second drive outputs connected to the control terminals of the first and second switches, respectively, to selectively turn the first and second switches On and Off to alternatively charge/discharge the inductive device, the first and second switches being connected in series with one another, wherein the first junction between the first and second capacitors is connected to the second controlled terminals of the first and second switches to filter common-mode voltage.

2. The power supply of claim 1, wherein the center-tapped inductive device is a transformer having a primary winding and a secondary winding, wherein the primary winding is bifurcated into the first winding and the second winding, and the secondary winding includes first and second ends connected to direct current (DC) output terminals via respective first and second diodes.

3. The power supply of claim 1, further including:
   a first diode connected to the second end of the first winding and a DC output terminal; and
   a second diode connected to the second end of the second winding and the DC output terminal, wherein the first and second diodes are connected to rectify and communicate discharged energy from the inductive device to the DC output terminal.

4. The power supply of claim 1, wherein the controller drives the first and second switches On and Off synchronously.

5. The power supply of claim 1, wherein the controller drives the first switch On and Off during a positive half-cycle of the AC input and second switch On and Off during a negative half-cycle of the AC input.

6. The power supply of claim 1, further including:
   a first inductor connected between the first terminal and the first end of the first winding in the center-tapped inductive device; and
   a second inductor connected between the second terminal and the first end of the second winding in the center-tapped inductive device, the first and second inductors providing in conjunction with the first and second capacitors a first stage two-pole filter.

7. The power supply of claim 1, further including:
   a first current sense resistor and a second current sense resistor connected between the second controlled terminal of the first switch and the second controlled terminal of the second switch.

8. The power supply of claim 1, further including:
   a tertiary winding coupled to the center-tapped inductive device to supply power to the controller based on modulations in current through the first and second windings of the center-tapped inductive device.

9. A series-switch, bridgeless power supply comprising:
   first and second input terminals for receiving an alternating current (AC) input;
   a first and second capacitor connected in series with one another between the first and second terminals, a first junction being defined between the first and second capacitor;
   a center-tapped transformer having a primary winding and a secondary winding, the primary winding bifurcated into a first winding and a second winding;
   a first switch having a control terminal and first and second controlled terminals, the first controlled terminal connected to the first winding;
   a second switch having a control terminal and first and second controlled terminals, the first controlled terminal connected to the second winding and the second controlled terminal connected to the second controlled terminal of the first switch; and
   a controller having first and second drive outputs connected to the control terminals of the first and second switches, respectively, to selectively turn the first and second switches On and Off to alternatively charge/discharge the primary winding to transfer energy to the secondary winding of the transformer, wherein the first and second switches are controlled to create a first circuit path from the first input terminal, through the first winding of the inductive device, the first switch, the second switch, the second winding of the inductive device, and to the second input terminal, the second controlled terminals of the first and second switches being connected to the junction between the first and second capacitors to provide a filter for filtering common-mode voltage at the center-tap position of the inductive device.

10. The power supply of claim 9, wherein the controller drives the first and second switches On and Off synchronously.

11. The power supply of claim 9, wherein the controller drives the first switch On and Off during a positive half-cycle of the AC input and second switch On and Off during a negative half-cycle of the AC input.

12. The power supply of claim 9, further including:
a first inductor connected between the first terminal and the first winding in the center-tapped transformer; and
a second inductor connected between the second terminal and the second winding in the center-tapped transformer, the first and second inductors providing in conjunction with the first and second capacitors a first stage two-pole filter.

13. The power supply of claim 9, further including:
a first current sense resistor and a second current sense resistor connected between the second controlled terminal of the first switch and the second controlled terminal of the second switch, wherein the controller monitors current in the power supply based on voltage measured across the first current sense resistor and the second current sense resistor.

14. The power supply of claim 9, further including:
a tertiary winding coupled to the center-tapped inductive device to supply power to the controller based on modulations in current through the first and second windings of the center-tapped inductive device.

* * * * *